(12) United States Patent
Mito

(10) Patent No.: US 10,381,846 B2
(45) Date of Patent: Aug. 13, 2019

(54) ELECTRIC VEHICLE

(71) Applicant: Toyota Jidosha Kabushiki Kaisha, Toyota-shi, Aichi-ken (JP)

(72) Inventor: Nobufumi Mito, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 364 days.

(21) Appl. No.: 15/476,245

(22) Filed: Mar. 31, 2017

(65) Prior Publication Data
US 2017/0294791 A1 Oct. 12, 2017

(30) Foreign Application Priority Data
Apr. 7, 2016 (JP) .................................. 2016-077574

(51) Int. Cl.
*B60L 1/00* (2006.01)
*B60L 3/00* (2019.01)
(Continued)

(52) U.S. Cl.
CPC .......... *H02J 7/0029* (2013.01); *B60L 3/0038* (2013.01); *B60L 3/0046* (2013.01); *B60L 3/04* (2013.01); *H02M 1/08* (2013.01); *H02M 1/143* (2013.01); *H02M 7/537* (2013.01); *H02P 3/18* (2013.01); *H02P 6/24* (2013.01); *B60L 2220/42* (2013.01); *H02J 7/345* (2013.01); *H02M 7/48* (2013.01); *H02M 2001/007* (2013.01); *H02M 2001/322* (2013.01); *Y02T 10/646* (2013.01)

(58) Field of Classification Search
CPC ........ B60L 3/0038; B60L 3/0046; B60L 3/04; B60L 2220/42; H02J 7/0029; H02J 7/345; H02M 1/08; H02M 1/143; H02M 7/537; H02M 2001/007; H02M 2001/322; H02M 7/48; H02P 3/18; H02P 6/24; Y02T 10/646
USPC ....................................................... 307/10.1
See application file for complete search history.

(56) References Cited

U.S. PATENT DOCUMENTS 8,415,825 B2 * 4/2013 Hirose ................... B60K 6/445
307/9.1
2010/0214055 A1 8/2010 Fuji et al.
2015/0231972 A1 8/2015 Oi et al.

FOREIGN PATENT DOCUMENTS

JP 2010193691 A 9/2010
JP 2011259517 A 12/2011
(Continued)

*Primary Examiner* — Rexford N Barnie
*Assistant Examiner* — Toan T Vu
(74) *Attorney, Agent, or Firm* — Dinsmore & Shohl LLP

(57) ABSTRACT

An electric vehicle that has: a DC power supply; an inverter; an inverter control circuit; a smoothing capacitor that is connected between input terminals of the inverter; a discharge circuit that discharges the smoothing capacitor; a control power supply that supplies electric power to the inverter control circuit; a holding capacitor that stores the electric power supplied from the control power supply and supplies the electric power to the inverter control circuit; and a collision detector that detects a collision of the vehicle. The collision detector transmits a first signal and a second signal that follows the first signal when detecting the collision. The inverter control circuit stops supplying the electric power to a switching element drive circuit when receiving the first signal. The inverter control circuit discharges the smoothing capacitor when receiving the second signal.

5 Claims, 5 Drawing Sheets

(51) Int. Cl.
  *H02G 3/00* (2006.01)
  *H02J 7/00* (2006.01)
  *B60L 3/04* (2006.01)
  *H02M 1/08* (2006.01)
  *H02M 1/14* (2006.01)
  *H02M 7/537* (2006.01)
  *H02P 6/24* (2006.01)
  *H02P 3/18* (2006.01)
  *H02J 7/34* (2006.01)
  *H02M 7/48* (2007.01)
  *H02M 1/00* (2006.01)
  *H02M 1/32* (2007.01)

(56) References Cited

FOREIGN PATENT DOCUMENTS

| | | |
|---|---|---|
| JP | 2014113878 A | 6/2014 |
| JP | 2015-156761 A | 8/2015 |

\* cited by examiner

ELECTRIC VEHICLE

CROSS-REFERENCE TO RELATED APPLICATIONS

This application claims priority to Japanese Patent Application No. 2016-077574 filed on Apr. 7, 2016 which is incorporated herein by reference in its entirety including the specification, drawings and abstract.

BACKGROUND

1. Technical Field

A technique disclosed in this specification relates to an electric vehicle. The electric vehicle disclosed in this specification means an automobile that includes a travel motor for rotating drive wheels. The electric vehicle includes an automobile that includes an engine in addition to the travel motor (a so-called hybrid vehicle), an automobile that supplies electric power from a battery to the travel motor, and an automobile that supplies electric power from a fuel cell to the travel motor (a so-called fuel cell vehicle).

2. Description of Related Art

A hybrid vehicle that rotates drive wheels by an engine and a travel motor has been disclosed in Japanese Patent Application Publication No. 2015-156761 (JP 2015-156761 A). A circuit that drives the travel motor has: an inverter that converts a direct current (DC) voltage to an alternating current (AC) voltage and supplies the AC voltage to the travel motor; and an inverter control circuit (a control section) that controls the inverter. A smoothing capacitor for suppressing pulsations of the voltage is connected between input terminals of the inverter. This hybrid vehicle has a discharge circuit for discharging the smoothing capacitor. When a collision of the vehicle is detected, the inverter control circuit controls the discharge circuit to discharge the smoothing capacitor.

SUMMARY

The collision of the vehicle is detected by a collision detector. The collision detector outputs a signal indicative of the collision when the vehicle collides. There is a case where noise is superposed on the output signal of the collision detector. In order to accurately detect the collision of the vehicle without an influence of the noise, it is required to monitor the output signal of the collision detector for a specified time since the output signal of the collision detector indicates the collision of the vehicle for the first time. In the cases where the output signal of the collision detector indicates the collision of the vehicle but returns to a value indicative of no collision immediately thereafter, it can be determined that the noise is superposed on the output signal. In the case where the output signal of the collision detector indicates the collision of the vehicle for a certain period, it can be determined that the vehicle collides. Thus, a relatively long time (for example, 180 msecs) is required from time at which the vehicle actually collides to time at which the collision thereof is detected.

As described above, in the hybrid vehicle disclosed in JP 2015-156761 A, the inverter control circuit discharges the smoothing capacitor when detecting the collision of the vehicle. In addition, as described above, the relatively long time is required from the time at which the vehicle actually collides to the time at which the collision of the vehicle is detected. Accordingly, a relatively long time is required from the time at which the vehicle actually collides to time at which the smoothing capacitor starts being discharged. For this reason, there is a case where the electric power supply to the inverter control circuit is interrupted by the collision of the vehicle before discharge of the smoothing capacitor and thus the inverter control circuit cannot discharge the smoothing capacitor.

An electric vehicle disclosed in this specification includes: a DC power supply; a switching element; a switching element drive circuit that drives the switching element; an inverter that converts a DC voltage of the DC power supply to an AC voltage; an inverter control circuit that controls the inverter; a travel motor that is rotated by the AC voltage; a smoothing capacitor that is connected between input terminals of the inverter; a discharge circuit that discharges the smoothing capacitor; a control power supply that supplies electric power to the inverter control circuit; a holding capacitor that stores the electric power supplied from the control power supply and supplies the electric power to the inverter control circuit; and a collision detector that detects a collision of the vehicle. The inverter control circuit has: a switching circuit that switches between a state of supplying the electric power to the switching element drive circuit and a state of stopping supplying the electric power to the switching element drive circuit; and a discharge control circuit that controls the discharge circuit. The collision detector is configured to transmit a first signal and a second signal that follows the first signal to the inverter control circuit when detecting the collision of the vehicle. The switching circuit stops supplying the electric power to the switching element drive circuit when the inverter control circuit receives the first signal, and the discharge control circuit discharges the smoothing capacitor when the inverter control circuit receives the second signal.

According to this electric vehicle, discharge of the smoothing capacitor by noise can be prevented, and reliability of discharging the smoothing capacitor during the collision can be improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
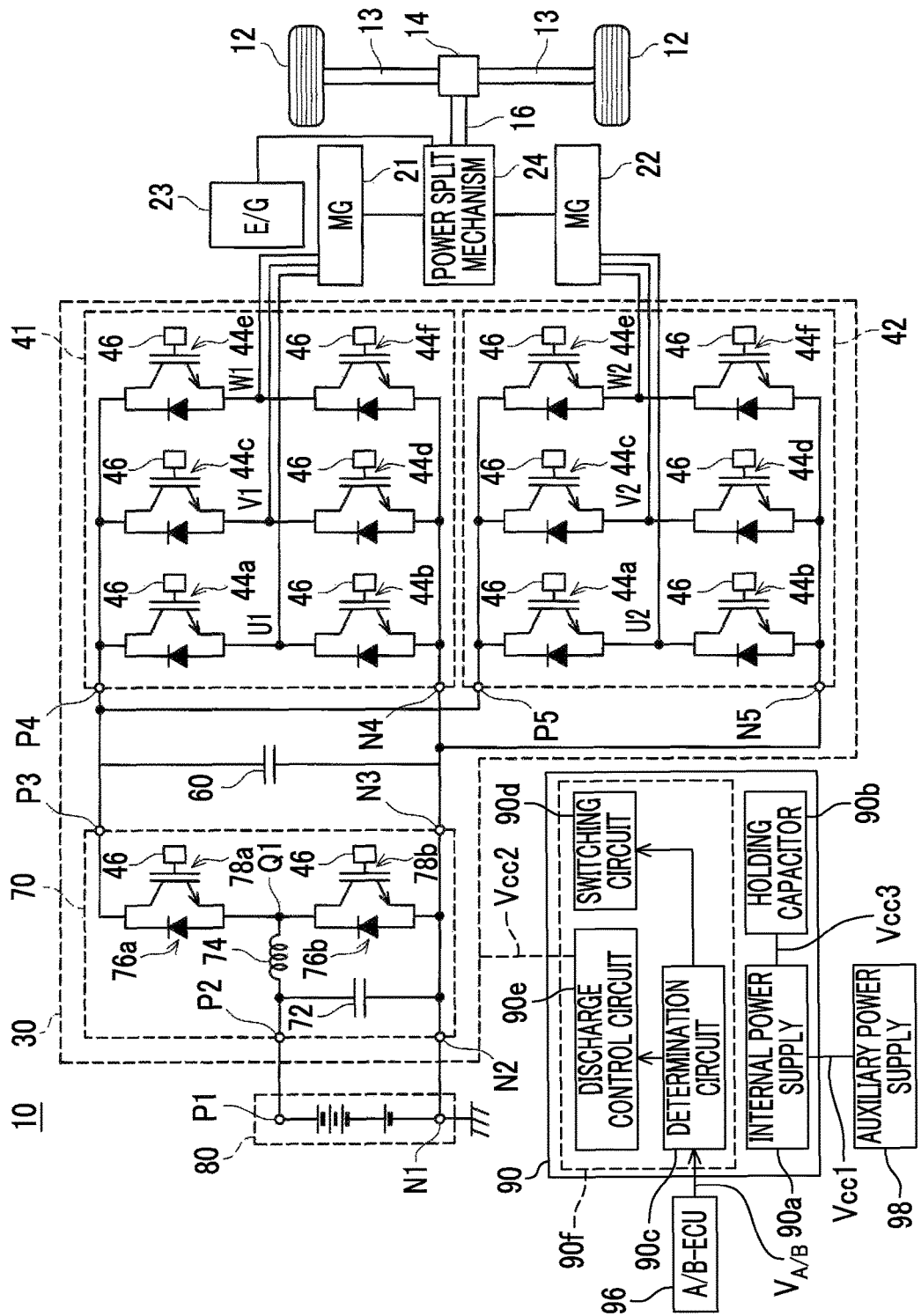
FIG. 1 is a circuit diagram that shows an electrical configuration of a hybrid vehicle 10 according to a first embodiment.

A hybrid vehicle 10 of a first embodiment, which is shown in FIG. 1, travels while two drive wheels 12 are rotated by motor generators 21, 22 (hereinafter referred to as MG) and an engine 23. Note that the MGs 21, 22 each function as a motor that is supplied with electric power from a battery 80 to drive the drive wheels 12 during acceleration and the like of the hybrid vehicle 10. In addition, the MGs 21, 22 each function as a generator that generates the electric power by rotation of the drive wheels 12 and supplies the electric power to the battery 80 during deceleration and the like of the hybrid vehicle 10. The MGs 21, 22 and the engine 23 are connected to the drive wheels 12 via a power split mechanism 24, a propeller shaft 16, a differential gear 14, and an axle 13. The power split mechanism 24 transmits power of the MG 21, the MG 22, and the engine 23 to the propeller shaft 16. The power split mechanism 24 can also block transmission of the power between the engine 23 and the propeller shaft 16 by a clutch mounted thereon. When the propeller shaft 16 is rotated by the power of the MG 21, the MG 22, and the engine 23, the rotation is transmitted to the axle 13 via the differential gear 14 and further rotates the axle 13 and the drive wheels 12.

The hybrid vehicle 10 has: the battery 80; and a voltage conversion circuit 30 that converts a DC voltage of the battery 80 to an AC voltage and supplies the AC voltage to the MGs 21, 22. The voltage conversion circuit 30 has a DC-DC converter 70, a smoothing capacitor 60, a first inverter 41, and a second inverter 42.

The battery 80 has a positive electrode terminal P1 and a negative electrode terminal N1. The battery 80 applies the DC voltage between the positive electrode terminal P1 and the negative electrode terminal N1.

The DC-DC converter 70 has a high potential input terminal P2, a low potential input terminal N2, a high potential output terminal P3, and a low potential output terminal N3. The high potential input terminal P2 is connected to the positive electrode terminal P1 of the battery 80. The low potential input terminal N2 is connected to the negative electrode terminal N1 of the battery 80. The DC-DC converter 70 performs a step-up operation and a step-down operation. In the step-up operation, the DC-DC converter 70 steps up a voltage that is applied between the input terminals P2, N2 by the battery 80, and outputs the step-up voltage between the output terminals P3, N3. The step-up operation is performed when the electric power is consumed by the MGs 21, 22. In the step-down operation, the DC-DC converter 70 steps down a voltage between the output terminals P3, N3 and outputs the step-down voltage between the input terminals P2, N2. In this way, the battery 80 is charged. The step-down operation is performed when the MGs 21, 22 are operated as the generators.

The DC-DC converter 70 has a capacitor 72, a reactor 74, an IGBT 78a, a diode 76a, an IGBT 78b, and a diode 76b. The capacitor 72 is connected between the input terminals P2, N2. The capacitor 72 smoothes the voltage between the input terminals P2, N2 and suppresses pulsations of this voltage. The low potential input terminal N2 and the low potential output terminal N3 are directly connected to each other. One end of the reactor 74 is connected to the high potential input terminal P2. The IGBT 78a and the diode 76a are connected in parallel between another end Q1 of the reactor 74 and the high potential output terminal P3. The diode 76a is connected in a direction in which a cathode is located on the high potential output terminal P3 side. The IGBT 78b and the diode 76b are connected in parallel between the other end Q1 of the reactor 74 and the low potential output terminal N3 (that is, the low potential input terminal N2). The diode 76b is connected in a direction in which an anode is located on the low potential output terminal N3 side. An IGBT drive circuit 46 is provided for each of the IGBT 78a and the IGBT 78b. Each of the IGBT drive circuits 46 is connected to a gate of the corresponding IGBT. Each of the IGBT drive circuits 46 charges/discharges the gate of the corresponding IGBT. In this way, the IGBTs 78a, 78b are each switched. The DC-DC converter 70 performs the step-up operation and the step-down operation when each of the IGBT 78a and the IGBT 78b is switched.

The first inverter 41 has a high potential input terminal P4, a low potential input terminal N4, and three output wires U1, V1, W1. The high potential input terminal P4 is connected to the high potential output terminal P3 of the DC-DC converter 70. The low potential input terminal N4 is connected to the low potential output terminal N3 of the DC-DC converter 70. The three output wires U1, V1, W1 are connected to the MG 21. The DC voltage between the output terminals P3, N3 of the DC-DC converter 70 (the higher DC voltage than the DC voltage of the battery 80) is applied between the input terminals P4, N4 of the first inverter 41. The first inverter 41 converts the DC voltage between the input terminals P4, N4 to a three-phase AC voltage and outputs the converted three-phase AC voltage to the output wires U1, V1, W1. When being supplied with the three-phase AC voltage from the first inverter 41, the MG 21 is rotated and thereby rotates the drive wheels 12.

The first inverter 41 has reverse conducting switching devices 44a to 44f. Each of the reverse conducting switching devices 44 is constructed of a parallel circuit of an IGBT and a diode. Each of the diodes is connected in a direction in which a cathode is located on a high potential side (the high potential input terminal P4 side). A series circuit of the reverse conducting switching devices 44a, 44b, a series circuit of the reverse conducting switching devices 44c, 44d, and a series circuit of the reverse conducting switching devices 44e, 44f are connected in parallel between the high potential input terminal P4 and the low potential input terminal N4. The output wire U1 is connected between the reverse conducting switching devices 44a, 44b, the output wire V1 is connected between the reverse conducting switching devices 44c, 44d, and the output wire W1 is connected between the reverse conducting switching devices 44e, 44f. The IGBT drive circuit 46 is provided for each of the IGBTs of the first inverter 41. Each of the IGBT drive circuits 46 is connected to a gate of the corresponding IGBT. Each of the IGBT drive circuits 46 charges/discharges the gate of the corresponding IGBT. In this way, each of the IGBTs is switched. The first inverter 41 is operated when each of the IGBTs is switched.

The second inverter 42 has a high potential input terminal P5, a low potential input terminal N5, and three output wires U2, V2, W2. The high potential input terminal P5 is connected to the high potential output terminal P3 of the DC-DC converter 70. The low potential input terminal N5 is connected to the low potential output terminal N3 of the DC-DC converter 70. The three output wires U2, V2, W2 are connected to the MG 22. An internal structure of the second inverter 42 is the same as an internal structure of the first inverter 41. The DC voltage between the output terminals P3, N3 of the DC-DC converter 70 is applied between the input terminals P5, N5 of the second inverter 42. The second inverter 42 converts the DC voltage between the input terminals P5, N5 to a three-phase AC voltage and outputs the converted three-phase AC voltage to the output wires U2, V2, W2. When being supplied with the three-phase AC voltage from the second inverter 42, the MG 22 is rotated and thereby rotates the drive wheels 12.

The smoothing capacitor 60 is connected between the input terminals P4, N4 of the first inverter 41. It can be said that the smoothing capacitor 60 is connected between the input terminals P5, N5 of the second inverter 42 or is connected between the output terminals P3, N3 of the DC-DC converter 70. The smoothing capacitor 60 smoothes the voltage between the input terminals P4, N4 of the first inverter 41 (that is, between the input terminals P5, N5 of the second inverter 42) and suppresses pulsations of this voltage. Because the high DC voltage is applied to the smoothing capacitor 60 during a normal travel, electric charges are stored in the smoothing capacitor 60.

The hybrid vehicle 10 has plural electronic control units (hereinafter referred to as ECUs). As shown in FIG. 1, the hybrid vehicle 10 has a motor generator-ECU (MG-ECU) 90 and an airbag-ECU (AB-ECU) 96. The MG-ECU 90 and the A/B-ECU 96 are connected to each other by wiring.

The MG-ECU 90 is connected to the voltage conversion circuit 30. In detail, the MG-ECU 90 is connected to each of the IGBT drive circuits 46 of the voltage conversion circuit 30. The MG-ECU 90 supplies a drive voltage to each of the IGBT drive circuits 46. Each of the IGBT drive circuits 46 charges the gate of the IGBT by using the drive voltage that is supplied from the MG-ECU 90. In addition, the MG-ECU 90 transmits a signal for commanding ON or OFF of the IGBT to each of the IGBT drive circuits 46. Each of the IGBT drive circuits 46 switches the corresponding IGBT in accordance with the signal transmitted from the MG-ECU 90. In this way, the first inverter 41, the second inverter 42, and the DC-DC converter 70 are operated.

The MG-ECU 90 is supplied with electric power from an auxiliary power supply 98. The MG-ECU 90 has an internal power supply 90a, a holding capacitor 90b, a determination circuit 90c, a switching circuit 90d, and a discharge control circuit 90e therein. The determination circuit 90c, the switching circuit 90d, and the discharge control circuit 90e are each constructed of a semiconductor integrated circuit 90f. The internal power supply 90a converts a voltage supplied from the auxiliary power supply 98 to a specified voltage and outputs the converted voltage. The output voltage of the internal power supply 90a is supplied to the semiconductor integrated circuit 90f. The output voltage of the internal power supply 90a is applied to the holding capacitor 90b. In addition, the holding capacitor 90b is connected to the semiconductor integrated circuit 90f. When the output voltage of the internal power supply 90a is stepped down by a collision of the vehicle, the voltage is supplied from the holding capacitor 90b to the semiconductor integrated circuit 90f. The A/B-ECU 96 is connected to the determination circuit 90c. A collision signal is transmitted from the A/B-ECU 96 to the determination circuit 90c. The determination circuit 90c determines a collision state on the basis of the collision signal. The switching circuit 90d switches each of the IGBT drive circuits 46 from the MG-ECU 90 between a state where the voltage is supplied and a state where a supply of the voltage is stopped. The discharge control circuit 90e can discharge the smoothing capacitor 60 by controlling the IGBTs of the first inverter 41.

The A/B-ECU 96 is connected to plural acceleration sensors, which are not shown. Based on data received from each of the acceleration sensors, the A/B-ECU 96 generates the collision signal indicative of whether the vehicle collides. The collision signal is transmitted to the determination circuit 90c of the MG-ECU 90.

Figure 2:
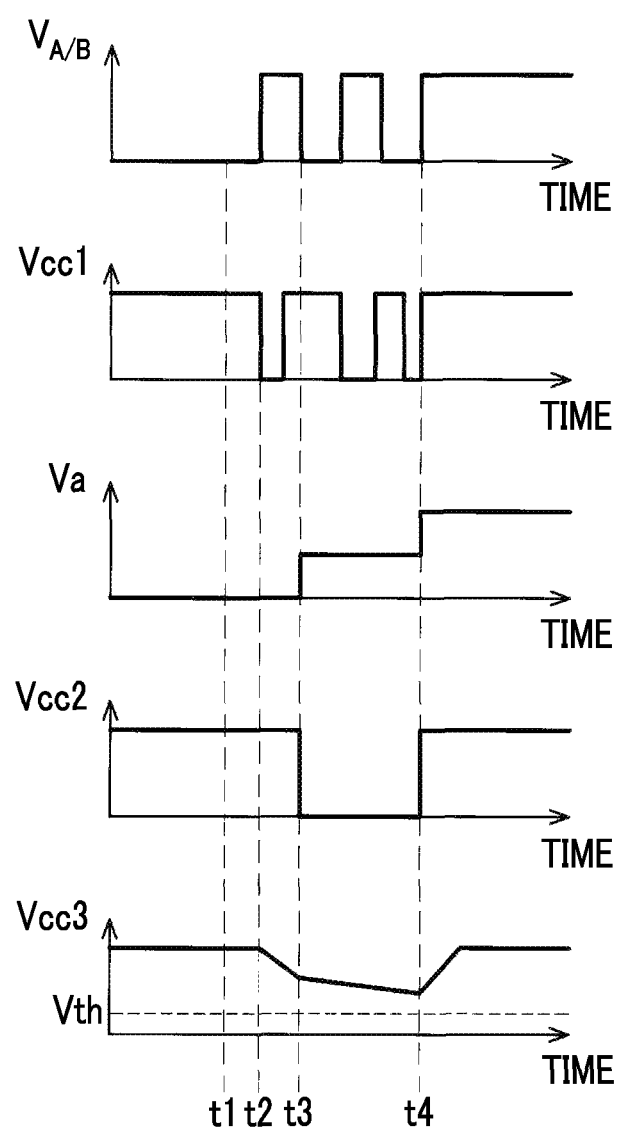
FIG. 2 includes graphs, each of which shows a change in a value during a collision, in the first embodiment.

Next, a detailed description will be made on an operation of the MG-ECU 90. FIG. 2 shows a change in each of the voltages during the collision of the vehicle. A voltage $V_{A/B}$ represents an output signal of the A/B-ECU 96. A voltage Vcc1 represents the output voltage of the auxiliary power supply 98. A voltage Va represents an output signal of the determination circuit 90c. A voltage Vcc2 represents the voltage supplied from the MG-ECU 90 to each of the IGBT drive circuits 46. A voltage Vcc3 represents the voltage supplied from the holding capacitor 90b to the semiconductor integrated circuit 90f (a voltage between both ends of the holding capacitor 90b and a voltage between output terminals of the internal power supply 90a). FIG. 2 shows a case where the vehicle normally travels in a period before timing t1 and the vehicle collides at the timing t1. In the normal travel, the output voltage Vcc1 of the auxiliary power supply 98 is stabilized at a high voltage. Thus, the voltage Vcc3 between both of the ends of the holding capacitor 90b is stabilized at a high voltage. In addition, in the normal travel, the voltage Vcc2 that is supplied from the MG-ECU 90 to each of the IGBT drive circuits 46 is maintained at a high voltage.

When the vehicle collides at the timing t1, the A/B-ECU 96 detects the collision of the vehicle immediately thereafter. Then, the A/B-ECU 96 vibrates the output signal $V_{A/B}$ between a low voltage and the high voltage for multiple times. In addition, when the vehicle collides at the timing t1, short circuit of a circuit, which is not shown and is connected to the auxiliary power supply 98, (for example, an electric component of the vehicle) occurs, and the output voltage Vcc1 of the auxiliary power supply 98 is stepped down. When a fuse is disconnected in the short circuit, the output voltage Vcc1 is restored to the normal voltage. However, when short circuit occurs to another circuit, the output voltage Vcc1 is stepped down again. Accordingly, the output voltage Vcc1 of the auxiliary power supply 98 is repeatedly stepped up and down after the collision. The output voltage of the internal power supply 90a thereby becomes unstable. Thus, at timing t2, at which the output voltage Vcc1 of the auxiliary power supply 98 is stepped down for the first time, onward, the output voltage of the internal power supply 90a becomes insufficient, and the electric power stored in the holding capacitor 90b is consumed by the semiconductor integrated circuit 90f. The voltage Vcc3 between both of the ends of the holding capacitor 90b is thereby stepped down at the timing t2 onward. When detecting step-down (step-down from the high voltage to the low voltage) of the output signal $V_{A/B}$ of the A/B-ECU 96 at timing t3, the determination circuit 90c steps up the output voltage Va from the low voltage to an intermediate voltage. Thereafter, the switching circuit 90d steps down the voltage Vcc2, which is supplied to each of the IGBT drive circuits 46, to the low voltage (approximately 0 V). That is, the switching circuit 90d stops supplying the electric power to each of the IGBT drive circuits 46. Accordingly, the operations of the inverters 41, 42 and the DC-DC converter 70 are stopped at the timing t3 onward. The electric power consumption by the MG-ECU 90 is thereby suppressed. Thus, a step-down speed of the voltage Vcc3 between both of the ends of the holding capacitor 90b is reduced at the timing t3 onward. At timing t4, the determination circuit 90c detects a third rise of the output signal $V_{A/B}$ of the A/B-ECU 96. The determination circuit 90c determines that the vehicle collides at this timing t4, and steps up the output voltage Va from the intermediate voltage to the high voltage. Thereafter, the switching circuit 90d steps up the voltage Vcc2, which is supplied to each of the IGBT drive circuits 46, from the low voltage to the high voltage. That is, the switching circuit 90d resumes supplying the electric power to each of the IGBT drive circuits 46. In addition, at the timing t4, the discharge control circuit 90e turns on some of the IGBTs of the first inverter 41 and discharges the smoothing capacitor 60. For example, the discharge control circuit 90e turns on the IGBT of the reverse conducting switching device 44a and the IGBT of the reverse conducting switching device 44d of the first inverter 41. In this case, current flows from a terminal on the high potential side of the smoothing capacitor 60 to a terminal on the low potential side of the smoothing capacitor 60 through the reverse conducting switching device 44a, the MG 21, and the reverse conducting switching device 44d. In this way, the smoothing capacitor 60 is discharged.

As it has been described so far, according to the configuration in the first embodiment, the smoothing capacitor 60 can be discharged during the collision of the vehicle. In particular, because the electric power consumption by the semiconductor integrated circuit 90f is suppressed in a period from the timing t3 to the timing t4, a sufficient amount of the electric power (the voltage) remains in the holding capacitor 90b at the timing t4. In this way, the semiconductor integrated circuit 90f can execute discharge processing of the smoothing capacitor 60 by using the electric power stored in the holding capacitor 90b. Note that, when the voltage Vcc3 between both of the ends of the holding capacitor 90b falls below a reset threshold Vth shown in FIG. 2, reset processing of the semiconductor integrated circuit 90f is required, and the operation of the semiconductor integrated circuit 90f is stopped for a specified period. In this case, the discharge processing of the smoothing capacitor 60 is significantly delayed. In the first embodiment, because the electric power consumption by the semiconductor integrated circuit 90f is suppressed in the period from the timing t3 to the timing t4, the voltage Vcc3 is prevented from falling below the reset threshold Vth. In this way, reliability of executing the discharge processing of the smoothing capacitor 60 immediately after the collision of the vehicle is improved.

Note that the output voltage Vcc1 of the auxiliary power supply 98 is restored to the voltage in a normal time at substantially the same timing as the timing t4 in FIG. 2. However, even when the output voltage Vcc1 of the auxiliary power supply 98 is not restored at the timing t4, the semiconductor integrated circuit 90f can execute the discharge processing of the smoothing capacitor 60 by using the electric power stored in the holding capacitor 90b.

Figure 3:
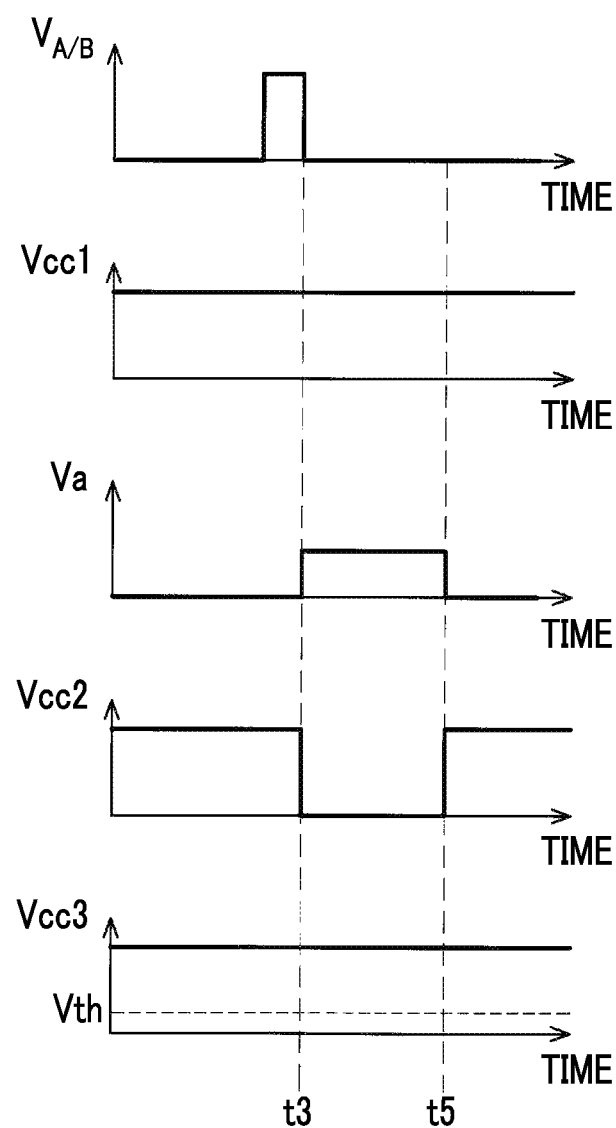
FIG. 3 includes graphs, each of which shows a change in the value during generation of noise, in the first embodiment.

FIG. 3 shows operations in the case where noise is superposed on the output signal $V_{A/B}$ of the A/B-ECU 96. In FIG. 3, the output signal $V_{A/B}$ has a single pulse that is resulted from the noise. In this case, the determination circuit 90c detects the step-down (the step-down from the high voltage to the low voltage) of the output signal $V_{A/B}$ of the A/B-ECU 96 at the timing t3. Then, the determination circuit 90c steps up the output voltage Va from the low voltage to the intermediate voltage. The switching circuit 90d then steps down the voltage Vcc2, which is supplied to each of the IGBT drive circuits 46, to the low voltage. Thus, the operations of the inverters 41, 42 and the DC-DC converter 70 are stopped at the timing t3 onward. In the case of FIG. 3, the output signal $V_{A/B}$ of the AB-ECU 96 is kept to have the low potential at the timing t3 onward. Thus, the determination circuit 90c does not detect the change in the output signal $V_{A/B}$ at the timing t3 onward. When the determination circuit 90c does not detect a specified change in the output signal $V_{A/B}$ in a period from the timing t3 to timing t5, at which the specified period elapses, the determination circuit 90c steps down the output voltage Va from the intermediate voltage to the low voltage. Accordingly, the switching circuit 90d steps up the voltage Vcc2, which is supplied to each of the IGBT drive circuits 46, to the high voltage at the timing t5. That is, the switching circuit 90d resumes supplying the electric power to each of the IGBT drive circuits 46. Accordingly, the inverters 41, 42 and the DC-DC converter 70 each resume being operated at the timing t5 onward. A period from the timing t3 to the timing t5 (a period in which the operations of the inverters 41, 42 and the DC-DC converter 70 are stopped) is short enough not to influence the travel of the vehicle. Thus, even when the noise is superposed on the output signal $V_{A/B}$, the travel of the vehicle can be continued.

As it has been described so far, according to the hybrid vehicle 10 of the first embodiment, erroneous discharge of the smoothing capacitor 60 can be prevented even when the noise is superposed on the output signal $V_{A/B}$ of the A/B-ECU 96. In addition, the smoothing capacitor 60 can be discharged even when the output voltage Vcc1 of the auxiliary power supply 98 is stepped down due to the collision of the vehicle.

Second Embodiment

Figure 4:
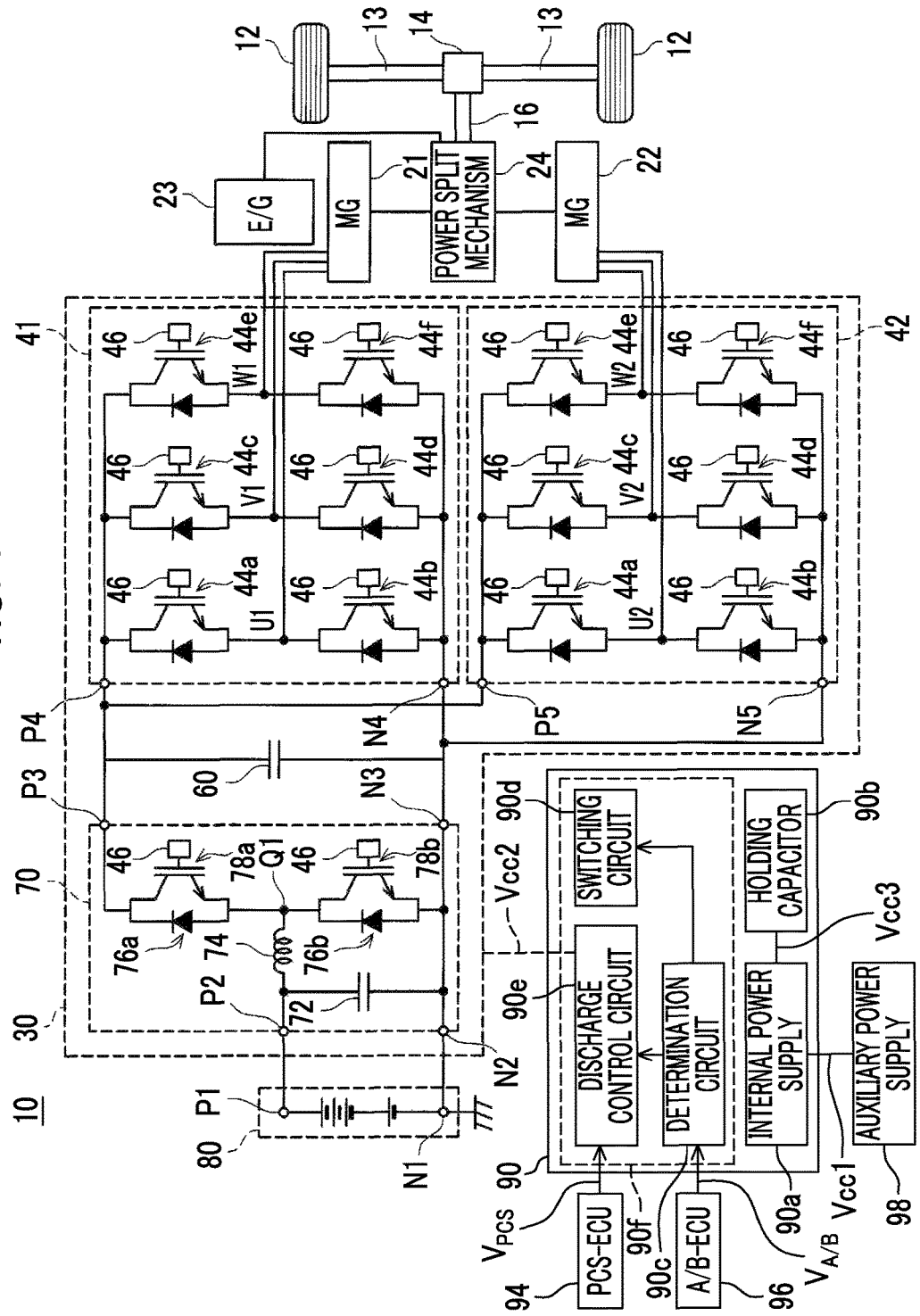
FIG. 4 is a circuit diagram that shows an electrical configuration of a hybrid vehicle 10 according to a second embodiment.

A hybrid vehicle in a second embodiment, which is shown in FIG. 4, has a pre-crash safety-ECU (PCS-ECU) 94. The PCS-ECU 94 determines presence or absence of a possibility of the collision from a traveling state of the vehicle before the collision of the vehicle occurs. The other configuration of the hybrid vehicle in the second embodiment is the same as that of the hybrid vehicle 10 in the first embodiment.

The PCS-ECU 94 is connected to the MG-ECU 90. In addition, the PCS-ECU 94 is connected to a sensor group, which is not shown. The sensor group has a large number of sensors that detect the traveling state of the hybrid vehicle. For example, a millimeter-wave radar or a camera that detects an obstacle and another vehicle around the vehicle, the acceleration sensor that detects the acceleration applied to the vehicle, a vehicle speed sensor that detects a travel speed of the vehicle, an angle sensor that detects a steering angle of a steering wheel, and the like are included in the sensor group. Based on data measured by the sensor group, the PCS-ECU 94 determines whether there is the possibility of the collision of the vehicle. The PCS-ECU 94 transmits a collision possibility signal to the MG-ECU 90 when there is the possibility of the collision. The collision possibility signal is transmitted before timing at which the vehicle actually collides.

Figure 5:
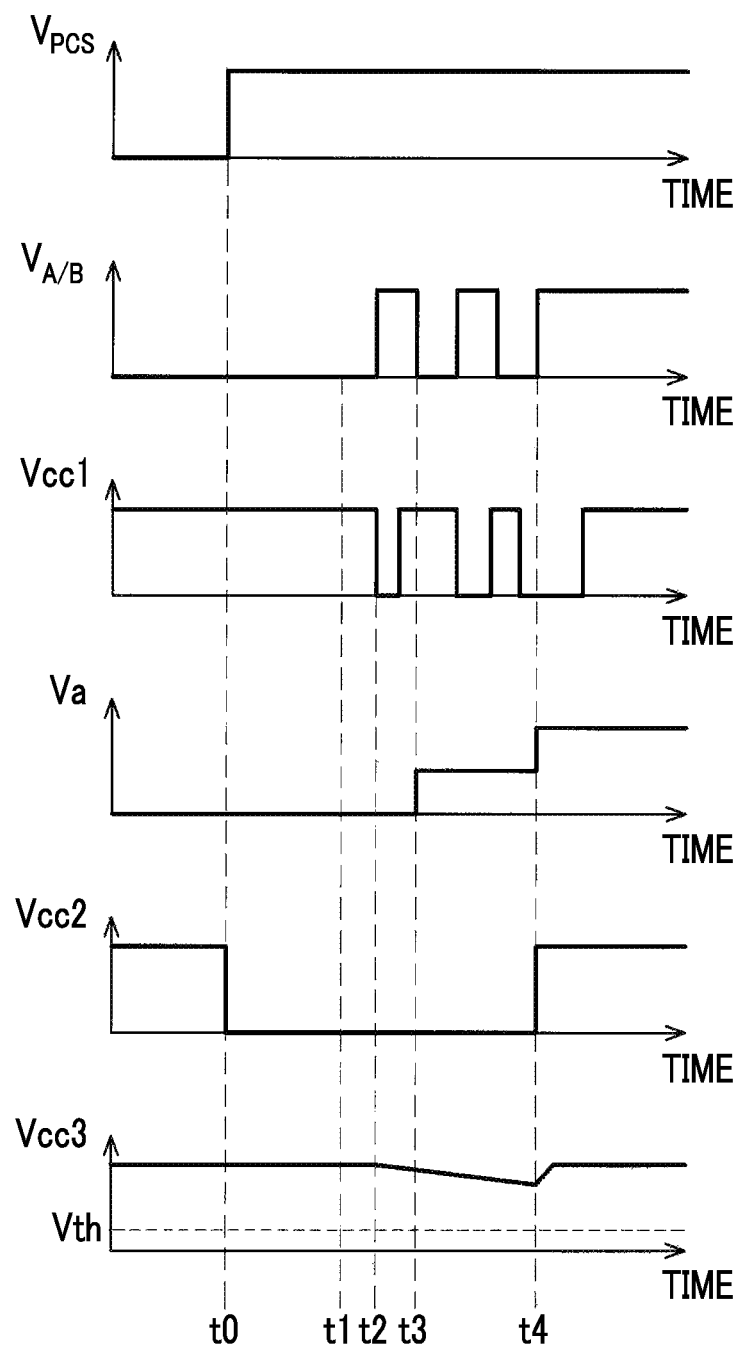
FIG. 5 includes graphs, each of which shows a change in the value during the collision in the second embodiment.

FIG. 5 shows a change in each of the values during the collision of the hybrid vehicle in the second embodiment. Similar to FIG. 3, the timing t1 is timing of the collision of the vehicle. In the hybrid vehicle of the second embodiment, at timing t0 prior to the timing t1, at which the vehicle collides, the PCS-ECU 94 determines that there is the possibility of the collision of the vehicle. Then, the PCS-ECU 94 steps up an output signal $V_{pcs}$ from the low potential to the high potential. The switching circuit 90d then steps down the voltage Vcc2, which is supplied to each of the IGBT drive circuits 46, to the low voltage (substantially 0 V). That is, the switching circuit 90d stops supplying the electric power to each of the IGBT drive circuits 46. Accordingly, the operations of the inverters 41, 42 and the DC-DC converter 70 are stopped at the timing t0 onward. In this way, the electric power consumption by the MG-ECU 90 is suppressed. When the vehicle collides at the timing t1, the output voltage Vcc1 of the auxiliary power supply 98 is thereafter repeatedly stepped up and down at the timing t2 onward. The output voltage of the internal power supply 90a thereby becomes unstable. Thus, the output voltage of the internal power supply 90*a* becomes insufficient at the timing t2 onward, and the electric power stored in the holding capacitor 90*b* is consumed by the semiconductor integrated circuit 90*f*. For this reason, the voltage Vcc3 between both of the ends of the holding capacitor 90*b* is stepped down. Meanwhile, because the supply of the electric power to each of the IGBT drive circuits 46 is stopped, an amount of the electric power that is consumed by the semiconductor integrated circuit 90*f* is small. Thus, the step-down speed of the voltage Vcc3 at the timing t2 onward is low. Similar to the first embodiment, the determination circuit 90*c* determines the collision of the vehicle. That is, when detecting the third rise of the output signal $V_{A/B}$ of the A/B-ECU 96 at the timing t4, the determination circuit 90*c* determines that the vehicle collides and steps up the output voltage Va to the high voltage. That is, similar to the first embodiment, the switching circuit 90*d* discharges the smoothing capacitor 60. According to the configuration of the second embodiment, because the electric power consumed by the semiconductor integrated circuit 90*f* has already been suppressed at the timing t2, the step-down of the voltage Vcc3 between both of the ends of the holding capacitor 90*b* can further be suppressed in comparison with that of the first embodiment. Thus, the smoothing capacitor 60 can further reliably be discharged at the timing t4, at which the collision of the vehicle is detected.

In addition, there is a case where noise is superposed on the output signal $V_{pcs}$ of the PCS-ECU 94. In this case, the voltage Vcc2, which is supplied to each of the IGBT drive circuits 46 by the switching circuit 90*d*, is stepped down at timing of step-up of the output signal $V_{pcs}$ by the noise. However, because the vehicle does not collide in this case, the output signal $V_{A/B}$ of the A/B-ECU 96 is not changed thereafter. When the switching circuit 90*d* does not detect a specified change in the output signal $V_{A/B}$ within a specified period from timing at which the output signal $V_{pcs}$ of the PCS-ECU 94 is stepped up, the switching circuit 90*d* steps up the voltage Vcc2, which is supplied to each of the IGBT drive circuits 46, to the high voltage. That is, the switching circuit 90*d* resumes supplying the electric power to each of the IGBT drive circuits 46. Accordingly, the inverters 41, 42 and the DC-DC converter 70 each resume being operated. In this case, a period in which the operations of the inverters 41, 42 and the DC-DC converter 70 are stopped is short enough not to influence the travel of the vehicle. Thus, the vehicle can continue traveling.

As it has been described so far, the smoothing capacitor 60 can also be discharged during the collision of the hybrid vehicle in the second embodiment. In addition, in the hybrid vehicle of the second embodiment, the erroneous discharge of the smoothing capacitor 60 can be prevented in the case where the noise is superposed on the output signal $V_{pcs}$ of the PCS-ECU 94. Furthermore, similar to the first embodiment, in the hybrid vehicle of the second embodiment, the erroneous discharge of the smoothing capacitor 60 can be prevented in the case where the noise is superposed on the output signal $V_{A/B}$ of the A/B-ECU 96.

Note that the smoothing capacitor 60 is discharged by turning on the IGBTs of the first inverter 41 in the above-described first and second embodiments. However, the smoothing capacitor 60 may be discharged by turning on the IGBTs of the second inverter 42 or the IGBTs of the DC-DC converter 70. Alternatively, a discharge circuit (for example, a series circuit with a switch and a resistor) may be provided in parallel with the smoothing capacitor 60, and the smoothing capacitor 60 may be discharged by conducting the discharge circuit.

In addition to the smoothing capacitor 60, the capacitor 72 may be discharged during the collision of the vehicle. In addition, the MG-ECU 90 may perform the other operations that are required during the collision. According to the technique disclosed in this specification, the consumption of the electric power that is stored in the holding capacitor 90*b* can be suppressed. Thus, the MG-ECU 90 can execute a larger number of processes when the collision of the vehicle is detected.

The hybrid vehicle 10 according to the first and second embodiments has the DC-DC converter 70. However, the hybrid vehicle 10 may be configured that the DC-DC converter 70 is not provided and the voltage of the battery 80 is directly applied between the input terminals of the first inverter 41 and the second inverter 42. In addition, instead of the battery 80, another DC power supply, such as a fuel cell, may be used.

A description will be made on relationships between components of above-described embodiments and components of the claims. The battery 80 in the first and second embodiments is one example of the DC power supply in the claims. The semiconductor integrated circuit 90*f* in the first and second embodiments is one example of the inverter control circuit in the claims. The MGs 21, 22 in the first and second embodiments are one example of the travel motor in the claims. The IGBTs of the first inverter 41 in the first and second embodiments are one example of the discharge circuit in the claims. The auxiliary power supply 98 and the internal power supply 90*a* in the first and second embodiments are one example of the control power supply in the claims. The A/B-ECU 96 in the first embodiment is one example of the collision detector in the claims. The A/B-ECU 96 and the PCS-ECU 94 in the second embodiment are one example of the collision detector in the claims. The step-down of the signal $V_{A/B}$ at the timing t3 in the first embodiment is one example of the first signal in the claims. The step-up of the signal $V_{pcs}$ at the timing t0 in the second embodiment is one example of the first signal in the claims. The step-up (the third step-up) of the signal $V_{A/B}$ at the timing t3 in the first and second embodiments is one example of the second signal in the claims.

Preferred configurations in the embodiments, which have been described so far, will hereinafter be listed. Note that the configurations, which will be listed below, are each useful independently.

In the electric vehicle of one example disclosed in this specification, the first signal is transmitted after the collision of the vehicle.

According to this configuration, as the collision detector, the collision detector of a type that detects an impact (for example, the acceleration or the like) by the collision of the vehicle can be used. An inexpensive collision detector can be used.

In the electric vehicle of the one example disclosed in this specification, the first signal is transmitted before the collision of the vehicle, and the second signal is transmitted after the collision of the vehicle.

According to this configuration, the electric power consumption by the inverter control circuit is suppressed from timing before the collision of the vehicle. Accordingly, the electric power consumption by the inverter control circuit can be suppressed in an entire period from timing at which the supply of the electric power from the control power supply to the inverter control circuit is interrupted to timing at which the smoothing capacitor is discharged. Thus, the even larger amount of the electric power can remain in the holding capacitor, and reliability of discharging the smoothing capacitor is further improved.

In the electric vehicle of the one example disclosed in this specification, the discharge circuit includes at least some of plural switching elements provided in the inverter. When the inverter control circuit receives the second signal, the switching circuit resumes supplying the electric power to a switching element drive circuit.

According to this configuration, the smoothing capacitor can be discharged via the plural switching elements provided in the inverter.

In the electric vehicle of the one example disclosed in this specification, when the inverter control circuit does not receive the second signal within a specified period after reception of the first signal, the switching circuit resumes supplying the electric power to the switching element drive circuit.

According to this configuration, the inverter can be returned to the normal operation when the collision does not occur.

The detailed description has been made so far on the embodiments. However, these are merely illustrative and thus do not limit the claims. The technique described in the claims includes various modifications and changes that are made to the specific examples illustrated so far. The technical elements described in this specification or the drawings exert technical utility singly or in various combinations, and are not limited to the combinations described in the claims at the time of filing. In addition, the technique illustrated in this specification or the drawings simultaneously achieves plural purposes and has the technical utility by achieving one of the purposes.

Note that the collision detector transmits the first signal and the second signal when detecting the collision of the vehicle; however, the first signal may be transmitted after the actual collision of the vehicle or may be transmitted before the actual collision of the vehicle. In the case where the collision detector is configured to transmit the first signal before the actual collision of the vehicle, the collision detector has a function of predicting the collision from a state of the vehicle.

In this electric vehicle, the collision detector transmits the first signal and the second signal when detecting the collision of the vehicle. The noise is possibly generated on a waveform that corresponds to the first signal. Thus, the first signal is a signal with low reliability. The second signal is a signal that is transmitted by following the first signal. A fact that the second signal is transmitted by following the first signal means that a possibility of the collision of the vehicle is high. That is, the second signal is a signal with high reliability.

In addition, when the vehicle actually collides, the supply of the electric power from the control power supply to the inverter control circuit is possibly interrupted. In this electric vehicle, even when the supply of the electric power from the control power supply is interrupted, the inverter control circuit can be operated by using the electric power that is supplied from the holding capacitor. However, the holding capacitor only stores a slight amount of the electric power.

In this electric vehicle, when the inverter control circuit receives the first signal, the switching circuit stops supplying the electric power to the switching element drive circuit. In this way, the electric power consumption by the inverter control circuit is suppressed. That is, when the vehicle actually collides, the inverter control circuit receives the first signal, and the switching circuit stops supplying the electric power to the switching element drive circuit before and after the collision. Accordingly, the consumption of the electric power stored in the holding capacitor is suppressed after the reception of the first signal. Thereafter, when the inverter control circuit receives the second signal, the discharge control circuit controls the discharge circuit and thereby discharges the smoothing capacitor. The consumption of the electric power stored in the holding capacitor is suppressed after the reception of the first signal. Thus, a sufficient amount of the electric power remains in the holding capacitor at the time of the reception of the second signal, and the discharge control circuit can be operated. Thus, in this electric vehicle, even when the supply of the electric power from the control power supply to the inverter control circuit is interrupted, the smoothing capacitor can be discharged.

In addition, when the waveform that corresponds to the first signal is generated by the noise, the inverter control circuit does not receive the second signal. In this case, the inverter control circuit does not discharge the smoothing capacitor. Thus, the erroneous discharge of the smoothing capacitor at a time of no-collision is prevented.

What is claimed is:

1. An electric vehicle comprising:
   a direct current power supply;
   a switching element;
   a switching element drive circuit that drives the switching element;
   an inverter that converts a direct current voltage of the direct current power supply to an alternating current voltage;
   an inverter control circuit that controls the inverter;
   a travel motor rotated by the alternating current voltage;
   a smoothing capacitor connected between input terminals of the inverter;
   a discharge circuit that discharges the smoothing capacitor;
   a control power supply that supplies electric power to the inverter control circuit;
   a holding capacitor that stores the electric power supplied from the control power supply and supplies the electric power to the inverter control circuit; and
   a collision detector that detects a collision of the vehicle, wherein
   the inverter control circuit has: a switching circuit that switches between a state of supplying the electric power to the switching element drive circuit and a state of stopping supplying the electric power to the switching element drive circuit; and a discharge control circuit that controls the discharge circuit,
   the collision detector is configured to transmit a first signal and a second signal that follows the first signal to the inverter control circuit when detecting the collision of the vehicle, and
   the switching circuit stops supplying the electric power to the switching element drive circuit when the inverter control circuit receives the first signal, and the discharge control circuit discharges the smoothing capacitor when the inverter control circuit receives the second signal.

2. The electric vehicle according to claim 1, wherein the first signal is transmitted after the collision of the vehicle.

3. The electric vehicle according to claim 1, wherein the first signal is transmitted before the collision of the vehicle, and the second signal is transmitted after the collision of the vehicle.

4. The electric vehicle according to claim 1, wherein
the discharge circuit includes at least some of plural switching elements, and
the switching circuit resumes supplying the electric power to the switching element drive circuit when the inverter control circuit receives the second signal.

5. The electric vehicle according to claim 1, wherein
the switching circuit resumes supplying the electric power to the switching element drive circuit when the inverter control circuit does not receive the second signal within a specified period after reception of the first signal.

\* \* \* \* \*

UNITED STATES PATENT AND TRADEMARK OFFICE
CERTIFICATE OF CORRECTION

PATENT NO. : 10,381,846 B2  
APPLICATION NO. : 15/476245  
DATED : August 13, 2019  
INVENTOR(S) : Nobufumi Mito Page 1 of 1

It is certified that error appears in the above-identified patent and that said Letters Patent is hereby corrected as shown below:

In the Specification

In Column 5, Line 16, delete "AB-ECU" and insert --A/B-ECU--, therefor.

In Column 7, Line 58, delete "AB-ECU" and insert --A/B-ECU--, therefor.

Signed and Sealed this  
Twenty-fourth Day of September, 2019

Andrei Iancu  
*Director of the United States Patent and Trademark Office*